A. HUBER.

MIRRORS.

No. 6,866. Reissued Jan. 18, 1876.

WITNESSES:

E. Wolff.

Alex F. Roberts

INVENTOR:

A. Huber

BY Munn & Co.

ATTORNEYS.

N. PETERS, PHOTO-LITHOGRAPHER, WASHINGTON, D. C.

UNITED STATES PATENT OFFICE.

ALLEN HUBER, OF BERLIN, CANADA.

IMPROVEMENT IN MIRRORS.

Specification forming part of Letters Patent No. 163,930, dated June 1, 1875; reissue No. 6,866, dated January 18, 1876; application filed November 6, 1875.

*To all whom it may concern:*

Be it known that I, ALLEN HUBER, of Berlin, Province of Ontario, Dominion of Canada, have invented a new and useful Improvement in Framing Mirrors, &c., of which the following is a specification:

The invention consists in new and useful improvements applied to the back of a glass, whereby liability to damage is greatly lessened. These will first be described in connection with an illustrative drawing, and then pointed out in the claim.

Figure 1:
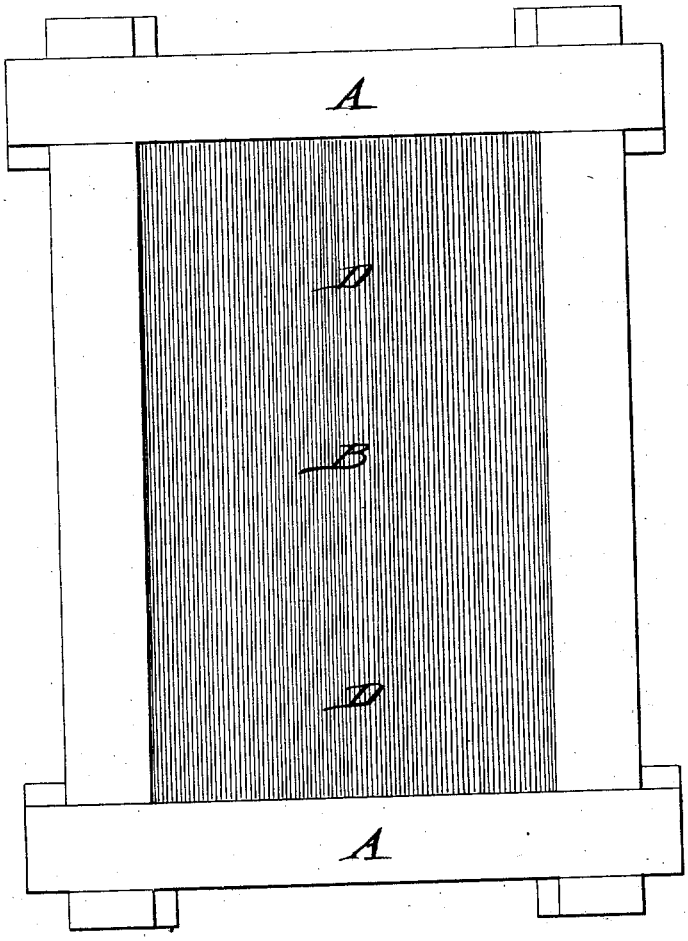
Figure 2:
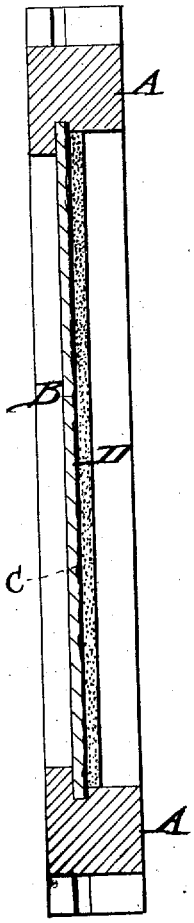

Figure 1 of drawing is a rear, and Fig. 2 a sectional, elevation.

A represents a mirror having the usual silvered back, and C a coating of varnish, oil-paper, or other water-proofing material. The latter may either be applied before or after the glass is placed in its frame. D represents a cement backing, placed in the rear of and over the water-proof material. This cement is made of gypsum or similar material, combined with water or other liquid until the whole is sufficiently thin to run, fill all the inequalities of surface, and form a thick coat to protect the glass.

If the glass is to be attached to frame, it remains therein while the cement hardens upon it; but if it is not, it is removed before the hardening occurs, and subsequently replaced.

Having thus described all that is necessary to a full understanding of my invention, what I claim as new is—

A glass in an inclosing-frame, provided with a coat of varnish or other water-proofing material between a cement backing and its rear face, as and for the purpose specified.

ALLEN HUBER.

Witnesses:
PAUL GOEPEL,
T. B. MOSHER.